United States Patent [19]
Overton

[11] 4,189,343
[45] Feb. 19, 1980

[54] VARIABLE SPEED DRUM CONCENTRATING MACHINE

[76] Inventor: Lyle S. Overton, 217 Phelps St., Decateur, Mich. 49045

[21] Appl. No.: 939,389

[22] Filed: Sep. 5, 1978

[51] Int. Cl.² ............................................. B01D 1/22
[52] U.S. Cl. ..................................... 159/11 R; 34/113
[58] Field of Search ......................... 159/9 R, 10, 11 R; 34/110, 113

[56] References Cited

U.S. PATENT DOCUMENTS

| | | | |
|---|---|---|---|
| 1,014,956 | 1/1912 | Drzymalia | 159/11 R |
| 2,391,033 | 12/1945 | Northcutt et al. | 159/11 R |
| 3,058,234 | 10/1962 | Stone | 34/110 |
| 3,068,585 | 12/1962 | Overton | 159/10 |
| 3,215,190 | 11/1965 | Svanoe | 159/11 R |

*Primary Examiner*—Norman Yudkoff
*Attorney, Agent, or Firm*—Marmaduke A. Hobbs

[57] ABSTRACT

A liquid concentrating and solid drying machine in which a pair of heated drums with smooth surfaces disposed in side-by-side relationship project downwardly into a tank, one of the drums preferably being of a smaller size than the other and extending into the liquid in the tank when the tank is operating at a certain level and being disposed above the liquid when the tank is operating at a lower level. Liquid is discharged in the area of close proximity between the two drums, and when both drums are partially immersed in the liquid, they both operate to concentrate the liquid, and when the liquid level falls below the smaller drum, the large drum continues to operate as a liquid concentrating drum and the smaller drum operates as a drying drum. Blades are provided for removing the material on the surface of the drums at the point where the surfaces are traveling generally upwardly, and a pivoted apron is provided adjacent the smaller drum beneath the blade to collect the material scraped from the respective drum and to discharge it from the machine.

10 Claims, 3 Drawing Figures

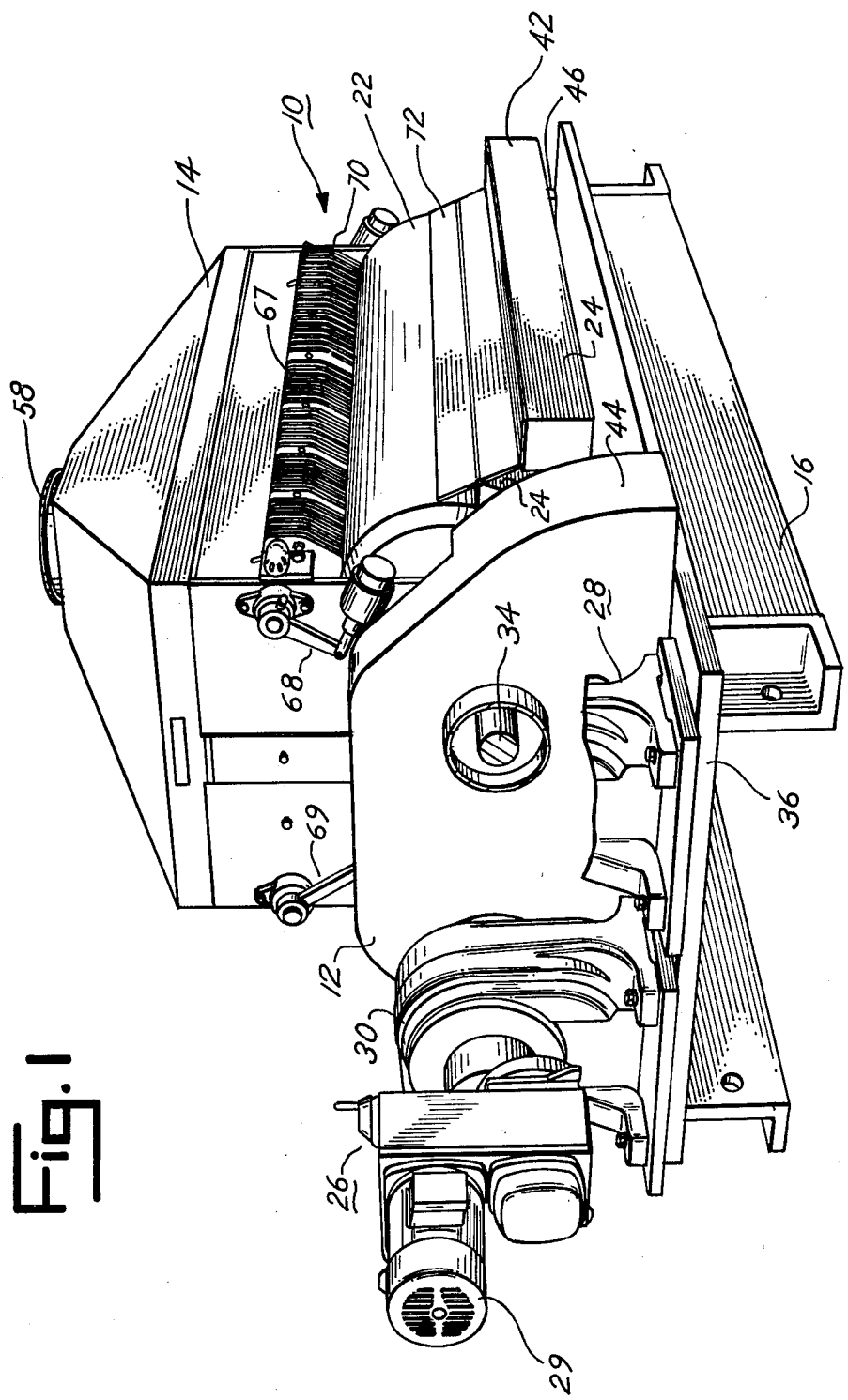

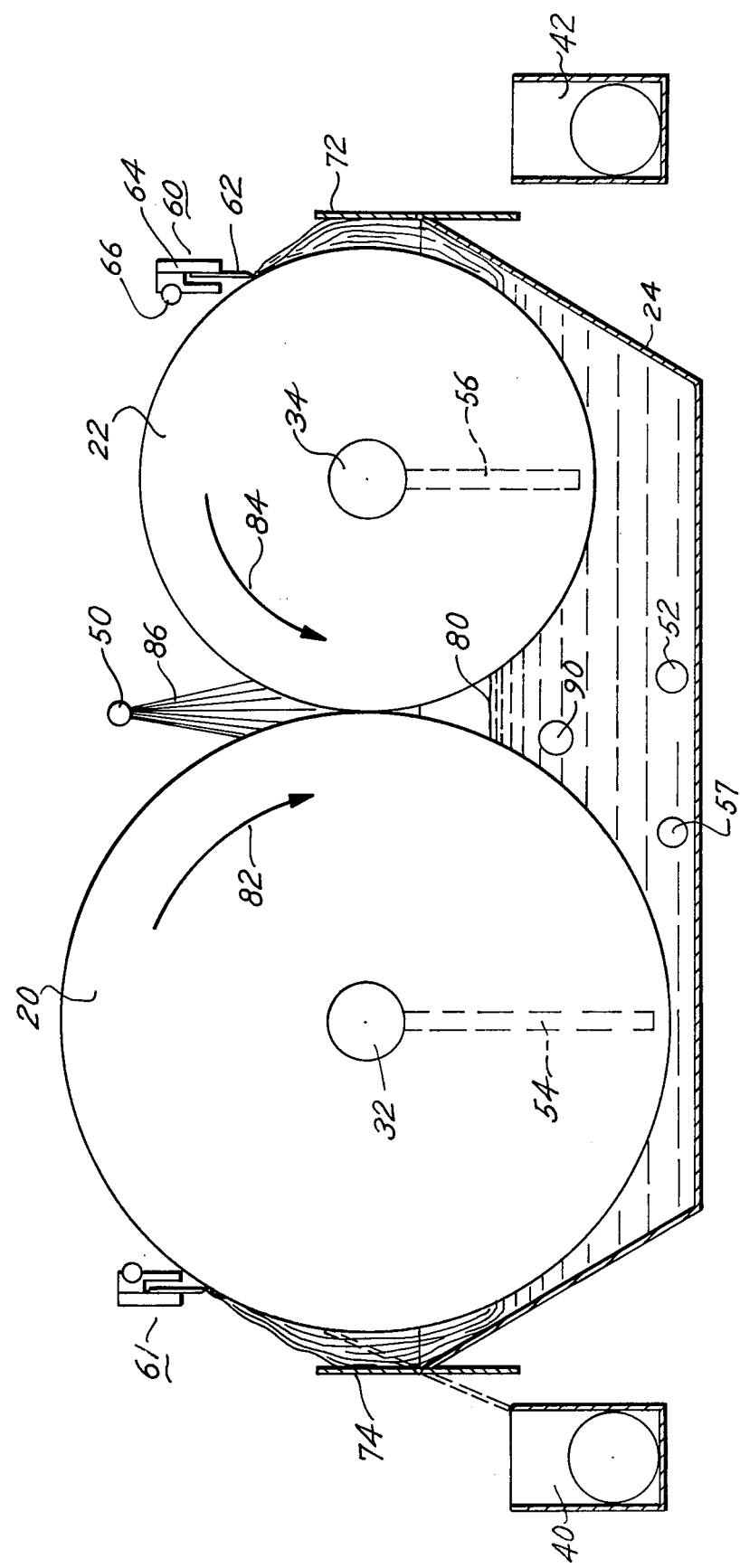

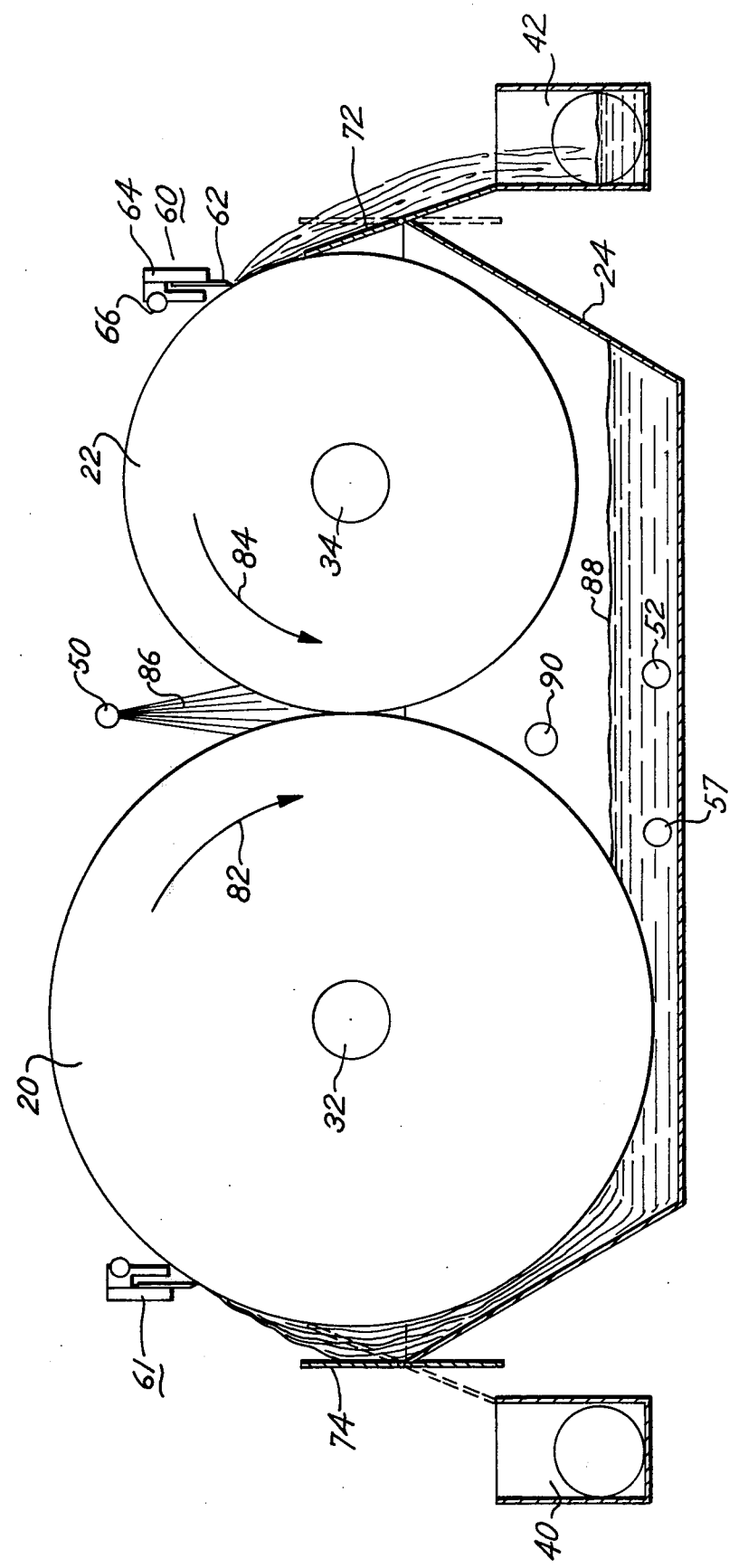

VARIABLE SPEED DRUM CONCENTRATING MACHINE

Machines are extensively used for drying solids initially suspended in liquids, wherein the liquid containing the solids in suspension is sprayed onto a heated rotating drum which evaporates the liquid, and the solids which tend to adhere to the surface of the drum are scraped off and discharged into a collecting receptacle or onto a conveyor. This type of dryer is efficient and economical to use if the suspended solids are of a relatively high concentration in the liquid so that prolonged operation of the heated drum is not required to remove excess liquid. Drum type machines are also used to concentrate liquids which may or may not be evaporated to obtain dry solids. These two types of machines are used to concentrate and then dry a variety of different liquids containing solids, such as printing press wash water, animal blood, cheese whey, and in ecological programs in which liquids are removed from the solids to obtain a compact, easily handled mass while eliminating the liquid, such as waste water in canning plants and in the citrus fruit industry. In operations in which there is a high ratio of liquid to solid requiring both types of the aforementioned machines, the operation is often slow and uneconomical to perform, and requires a relatively large investment in two machines which utilize separate spaces for operation and require separate maintainance, in addition to requiring the transfer of concentrated liquid from one machine to the other in order to complete the drying operation. It is therefore one of the principal objects of the present invention to provide a liquid concentrating and solid drying machine of the drum type, which provides a substantially higher capacity per square foot of drum surface than in the conventional machines for performing either of the two aforementioned operations, and which is capable of functioning solely as a liquid concentrator or solid dryer or as a combination of both operations.

Another object of the invention is to provide a liquid concentrating and solid drying machine which is compact in construction and simple to operate to perform either or both of the liquid concentrating and solid drying operations, and which can initially be operated solely as a liquid concentrator and, after the liquid has been concentrated to a preselected concentration, can be operated continuously as a concentrator and a dryer for extended periods of time without interruption of the operation of the machine.

Still another object of the invention is to provide a machine of the aforesaid type which can concentrate and/or dry a variety of different materials, and which shifts automatically from a solely drying operation to a combination of liquid concentrating and solid drying operation, and can thereafter continue to perform the combined operation while additional liquid material is supplied to the machine.

Further objects and advantages of the invention will become apparent from the following description and accompanying drawings, wherein:

FIG. 1 is a perspective view of a liquid concentrating and solid drying machine embodying the present invention;

FIG. 2 is a vertical cross sectional view showing the ends of the two drums in the machine in elevation, and the tank below the drum in cross section, illustrating one condition under which the machine operates; and FIG. 3 is a vertical cross sectional view similar to that shown in FIG. 2, illustrating another condition under which the machine operates.

Referring more specifically to the drawings, and to FIG. 1 in particular, numeral 10 indicates generally the present liquid containing and solid drying machine having a body 12, a hood 14 mounted over the body, and a base 16 for supporting the body. Mounted in body 12 are drums 20 and 22 which are rotatably disposed partially in a tank 24 and are driven separately by drive units 26 and 28, drive unit 28 being merely shown partially in outline since it is identical to unit 26, unit 26 driving drum 20 and unit 28 driving drum 22. Each of the drive units 26 and 28, which are variable speed types having an electric motor 29 and a variable speed reducer 30, is connected to the respective shafts 32 and 34 of drums 20 and 22 and they drive the respective drums independently of one another. The details of the drive units will not be described herein since the units are purchased items readily available on the market. The two units are bolted to a plate 36 which is rigidly secured to base 16 and forms a part thereof. FIGS. 2 and 3 illustrate containers 40 and 42 for receiving dried or flaked material removed from the rolls during the operation of the machine. No containers are shown in FIG. 1 and conveyors or other types of dried solid receiving means may be used in place of the two containers.

The two drums 20 and 22, which have smooth uninterrupted surfaces, extend downwardly into tank 24 with the larger drum extending to a point near the bottom and the smaller drum to a point spaced substantially above the lowest point of drum 20. The two drums are in contact with one another or in close proximity, so that only a small elongated space is provided between the drums for the liquid to flow therebetween. The two drums are rotated in opposite directions by drive units 26 and 28, and the rate of rotation of the two units may be varied under various conditions relative to one another to obtain optimum performance with respect to both the concentration of the liquid and the drying of the solids therefrom. The two drums 20 and 22 are mounted on shafts 32 and 34 and the shafts in turn are mounted on bearings or pillow blocks concealed in covers 44 and 46 of body 12, and extend outwardly from the covers for connection with the respective drive units. The liquid containing the suspended solid material is discharged through an elongated pipe 50, which is substantially the same length as the two drums and contains a series of closely spaced holes on the underside thereof for spraying the liquid onto the drums in the area near the point of contact between the two drums as illustrated in FIGS. 2 and 3. Pipe 50 is connected by a pipe and a pump to outlet 52 near the bottom of tank 24 so that the pump can withdraw the liquid in the tank and deliver it to pipe 50 where it is discharged onto the drums. This recirculation of the liquid between the tank and drums continues until the liquid is evaporated to the desired concentration or the solids are dried and removed from the machine.

The drums are heated by heating elements or systems 54 and 56 shown schematically in the drums, which for the purpose of the present invention may be considered as conventional heating units, either steam or electric. Various types of heating elements, which will give a controlled elevated temperature to the surface of the drums for effective evaporation and drying of the material handled by the machine may be used. Some solids tend to settle from the liquid, and in order to prevent this from occurring, air under pressure may be pumped into the lower portion of the tank through opening 57 to agitate the liquid and solids so that the liquid material will be substantially homogeneous throughout the operation of the machine. The liquid evaporated from the drums passes outwardly through outlet pipe 58 at the top of hood 14, and is either discharged into the atmosphere or reclaimed by suitable equipment, not forming a part of the present invention.

The material which tends to adhere to the two drums when they are performing the concentrating and/or drying functions is scraped therefrom by blade assemblies indicated generally by numerals 60 and 61. Each blade assembly consists of a blade 62 mounted on a holder 64 which in turn is pivoted to a rod 66. The blades are uniformly held against the respective drums throughout their length by a series of fingers, indicated generally by numeral 67, which apply pressure uniformly along the length of the blade. These fingers are pivoted on a shaft 70 and a resilient member such as a pneumatic tube presses the upper ends of the fingers outwardly and thereby pivots the lower ends of the fingers inwardly against the blade. The blade assemblies 60 and 61 are placed into operation and rendered inoperable by power control devices 68 and 69 mounted on both ends of body 12. Other types of blade assemblies may be used to perform the operation of removing the dried material from the drum.

Aprons 72 and 74 are disposed on opposite sides of the machine adjacent the drums and beneath the respective blade assemblies. The aprons are pivoted to the upper edge of the tank, and when they are tilted inwardly in the manner illustrated in FIG. 3, with apron 72, the material scraped from the drum by the blade is directed into container 42 or onto a conveyor or other suitable receptacle. When the apron is tilted outwardly as illustrated by apron 74, the material removed from the respective drum falls back into the tank.

In the operation of the present liquid concentrating and solid drying machine, the tank is filled with material to be concentrated and/or dried to a level indicated generally by numeral 80 in FIG. 2. With the tank filled as indicated, the two drums are rotated relatively fast, for example, 25 to 35 rpm in the direction indicated by arrows 82 and 84. The liquid is pumped from the tank through pipe 50 and sprayed into the area where the two drums are in close proximity, as shown at numeral 86. During this period of rapid rotation the drum surfaces are heated by the heating system contained in the drums, and the liquid on the drums is continuously evaporated and is discharged through opening 58 in hood 14. The two blades are normally against the drum during this evaporation stage, and both aprons are turned to the position illustrated by apron 74 in FIG. 3, i.e., tilted outwardly at the top so that the liquid carried upwardly on the surface of the drum is returned to the tank.

This evaporation operation by the two drums continues until the level of the liquid falls below the bottom of drum 22. The rapid rotation of the drums increases the rate at which the liquid is evaporated from the liquid material in the tank, thus increasing the efficiency of the machine while the evaporation and concentration of the liquid material are being performed. When the level falls below the bottom of drum 22, the speed of drum 22 is reduced to a relatively slow speed such as, for example, 8 to 14 rpm. At this point in the operation, the large drum 20 continues to operate as a concentrating drum and is rotated at a relatively high rate of speed. With apron 72 tilted inwardly at the top as illustrated in FIG. 3, drum 22 operates as a drying drum with blade 62 scraping the dried material on the drum from the surface thereof and permitting it to fall onto apron 72 and thence into a receptacle such as the one illustrated at numeral 42. During the drying operation, the liquid is continuously pumped from the tank to pipe 50 where it is discharged as indicated at numeral 86, and the lower liquid level 88 is maintained by the addition through port 90 of more liquid to be concentrated and the solids therein dried; thus, the operation becomes a continuous concentrating and drying operation which may be performed efficiently for extended periods of time.

It is thus seen that a compact efficient concentrating and drying machine is utilized which provides high efficiency per square foot of drum surface utilized in concentrating and drying. The dual operation performed by the machine can be used to concentrate and dry a variety of different kinds of liquids containing solids, such as printing press wash water, animal blood, cheese whey and waste water, as more fully described hereinbefore.

While only one embodiment of the present liquid concentrating and solid drying machine has been described in detail herein, various changes and modifications may be made without departing from the scope of the invention.

I claim:

1. A liquid concentrating and solid drying machine, comprising a tank for liquid materials containing solids in suspension or solution, a first drying and concentrating drum having a smooth uninterrupted surface extending only partially downwardly into said tank below a high normal operating liquid level therein and fully above a low normal operating liquid level therein, a second drying and concentrating drum having a smooth uninterrupted surface in close proximity to the surface of said first drum and extending downwardly into said tank to a point below said first drum, a conduit means for discharging the liquid materials between the drums in and above the area of close proximity of the surface of said drums, power means for counter-rotating said drums downwardly in the area of said close proximity and at different peripheral speeds and for rotating said first drum at variable speeds, blade means mounted adjacent said first drum for removing material from the surface thereof, and means for discharging the material removed from said first drum from said machine.

2. A liquid concentrating and solid drying machine as defined in claim 1 in which said second drum is of a larger diameter than said first drum.

3. A liquid concentrating and solid drying machine as defined in claim 1 in which the power means for rotating said drums includes a separate drive unit for rotating said first drum at a variable speed.

4. A liquid concentrating and solid drying machine as defined in claim 1 in which means is disposed within said drums for heating the surface thereof.

5. A liquid concentrating and solid drying machine as defined in claim 1 in which a blade is provided on each drum on the portion thereof in which the surface is traveling upwardly.

6. A liquid concentrating and solid drying machine as defined in claim 1 in which a blade is provided on each drum on the portion thereof in which the surface is traveling upwardly, and an apron moveable to a position away from the surface of said drums to a position substantially against said drums beneath said blades is mounted below the respective blade.

7. A liquid concentrating and solid drying machine as defined in claim 2 in which a blade is provided on each drum on the portion thereof in which the surface is traveling upwardly, and an apron moveable to a position away from the surface of said drums to a position substantially against said drums beneath said blades is mounted below the respective blade.

8. A liquid concentrating and solid drying machine as defined in claim 1 in which means is provided for circulating the liquid material between said tank and said conduit for supplying said conduit with liquid material from said tank.

9. A liquid concentrating and solid drying machine as defined in claim 2 in which the power means for rotating said drums includes a separate drive unit for rotating said first drum at a variable speed.

10. A liquid concentrating and solid drying machine as defined in claim 9 in which means is disposed within said drums for heating the surface thereof.

* * * * *